United States Patent
Hirai et al.

[11] Patent Number: 6,155,386
[45] Date of Patent: Dec. 5, 2000

[54] SPRING-ACTUATED ELECTROMAGNETIC BRAKE WITH NOISE SUPPRESSING DEVICE

[75] Inventors: Tatsuya Hirai; Kenshi Suzuki; Takaaki Tsuda; Masatoshi Sonoda, all of Osaka, Japan

[73] Assignee: Tsubakimoto Chain Co., Osaka, Japan

[21] Appl. No.: 09/474,156

[22] Filed: Dec. 29, 1999

[30] Foreign Application Priority Data

Feb. 1, 1999 [JP] Japan ................................. 11-024438

[51] Int. Cl.$^7$ ............................... B60L 7/00; B60T 13/04; F16D 19/00
[52] U.S. Cl. ...................... 188/161; 188/171; 192/84.5; 192/90
[58] Field of Search ....................... 188/158–164, 188/171; 192/84.5, 84.51, 90, 111 A; 310/77, 93

[56] References Cited

U.S. PATENT DOCUMENTS

| | | | |
|---|---|---|---|
| 4,684,838 | 8/1987 | Casanova ................................. | 310/93 |
| 4,982,825 | 1/1991 | Sekella ..................................... | 192/90 |
| 5,067,593 | 11/1991 | Tanaka et al. .......................... | 188/171 |
| 5,154,261 | 10/1992 | Tanaka et al. .......................... | 188/171 |
| 5,186,286 | 2/1993 | Lindberg ................................. | 188/171 |
| 5,433,297 | 7/1995 | Kuivamaki .............................. | 188/171 |

FOREIGN PATENT DOCUMENTS

7-16576  3/1995  Japan .

*Primary Examiner*—Chris Schwartz
*Attorney, Agent, or Firm*—Dann, Dorfman, Herrell and Skillman; Henry H. Skillman

[57] ABSTRACT

A spring-actuated electromagnetic brake includes an adjustment plate attached a rotating shaft and having an annular recess in one end face thereof facing a boss of a brake plate slidably mounted on the rotating plate. An annular elastic member is disposed in the annular recess in such a manner that when the brake is in the released state, the elastic member partially projects from the recess and is in contact with an end face of the boss. A slide-distance adjustment bolt having an enlarged head and a thread-free shank of a length larger than the thickness of the adjustment plate extends through an opening of the adjustment plate and is threaded on the end face of the boss. The brake plate is slidable in one direction by the force of the brake spring and in the opposite direction by the recovery force of the elastic member. The range of sliding movement of the brake plate is determined by the difference between the length of the shank of the bolt and the thickness of the adjustment plate. The gap provided between the armature and the lining when the brake is in the released state is smaller than the gap provided between the field and the armature when the brake is in the engaged state, so that a striking noise generated when the armature strikes against the lining by the force of brake springs is reduced correspondingly.

6 Claims, 6 Drawing Sheets

FIG.1

SPRING-ACTUATED ELECTROMAGNETIC BRAKE WITH NOISE SUPPRESSING DEVICE

BACKGROUND OF THE INVENTION

1. Field of the Invention

The present invention relates generally to a spring-actuated electromagnetic brake having a noise suppressing device for suppressing a striking noise generated when a spring-loaded armature strikes against a lining on a brake plate upon engagement of the brake.

2. Description of the Related Art

Figures 6A, 6B:
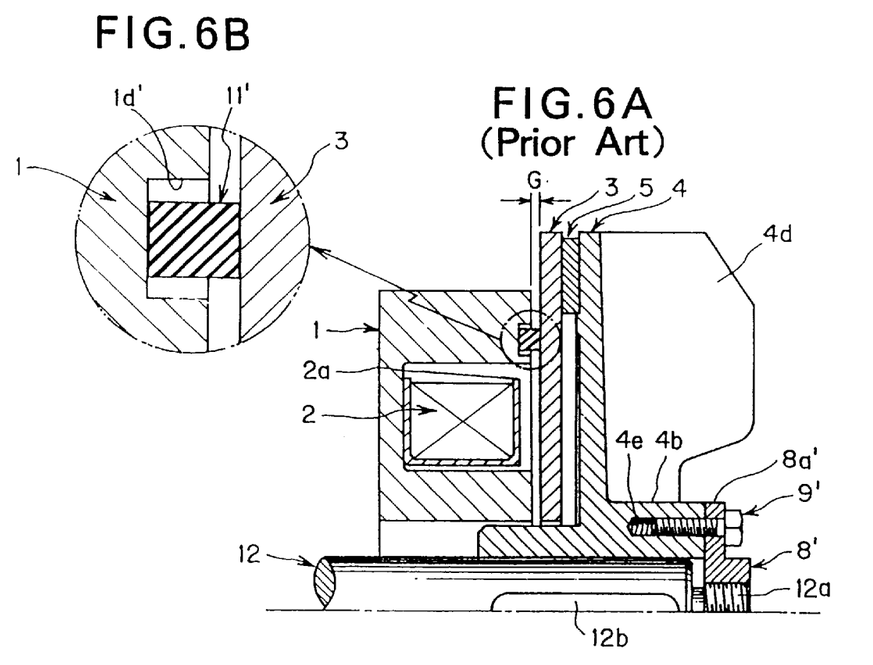
FIG. 6A is a fragmentary cross-sectional view showing a conventional electromagnetic brake having a noise suppressing device as it is in the engaged state.
FIG. 6B is an enlarged view of a portion of FIG. 6A.
Figures 7A, 7B:
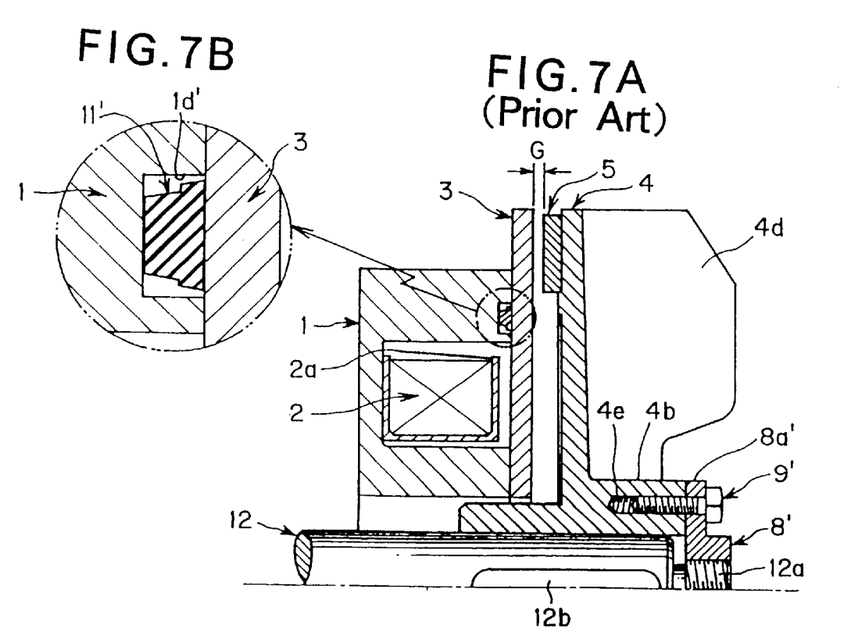
FIG. 7A is a view similar to FIG. 6A, but showing the conventional electromagnetic brake as it is in the released state.
FIG. 7B is an enlarged view of a portion of FIG. 7A.

FIGS. 6A and 7A show an example of conventionally known spring-actuated electromagnetic brakes having a noise suppressing device. The known electromagnetic brake includes a field 1 having a plurality of holes or recesses 1d' (one being shown) formed in an attracting surface onto which an armature 3 is attracted against the force of brake springs (not shown) when the field 1 is magnetized. A cylindrical noise-suppressing member 11' (FIG. 6B) made of rubber is disposed in each of the recesses 1d' in such a manner that when the brake is in the engaged state shown in FIG. 6A, the rubber noise-suppressing member 11' projects outward from the attracting surface, as better shown in FIG. 6B. The rubber noise-suppressing members 11' thus arranged can suppress a striking noise generated when the armature 3 is attracted onto the field 1 to thereby release the brake, as shown in FIG. 7A, upon excitation of an electromagnetic coil 2 to magnetize the field 1. When the brake is in the released state shown in FIG. 7A, there is a gap G between the armature 3 and a lining 5 on a brake plate 4. This means that when the brake is actuated again, the armature 3 is urged by the non-illustrated brake springs to move across the gap G and strike the lining 5. Upon striking, a sharp striking noise is emitted from the brake. The conventional spring-actuated electromagnetic brake has no function in reducing the level of striking noise generated when the spring-loaded armature 3 strikes against the lining 5 to engage the brake.

To lower such striking noise, it may be considered that the gap G be set small to reduce the striking distance of the armature 3 relative to the lining 5. In this case, however, there arises another problem that an extremely high degree of working accuracy is required for the manufacture of the field, armature, lining, brake plate and other parts of the brake.

SUMMARY OF THE INVENTION

It is accordingly an object of the present invention to provide a spring-actuated electromagnetic brake having a noise suppressing device which is capable of reducing the gap between an armature and the lining of a brake plate without requiring high working accuracy in manufacturing the brake parts, thereby achieving considerable suppression of an striking noise which is generated when the armature strikes against the lining to engage the brake.

To achieve the foregoing object, the present invention provides a spring-actuated electromagnetic brake including: a field having an electromagnetic coil embedded therein; a brake plate rotating in unison with a rotating shaft and having a lining provided on one surface thereof, and a boss having an end face facing in a direction away from the lining; an armature disposed between the field and the lining of the brake plate and movable only in the axial direction of the rotating shaft; and a brake spring urging the armature into pressure contact with the lining of the brake plate. The brake plate is mounted on the rotating shaft and slidably movable in the axial direction of the rotating shaft. An adjustment plate for regulating axial sliding movement of the brake plate is attached to the rotating shaft and has an end face opposite the end face of the boss of the brake plate. One of the end face of the adjustment plate and the end face of the boss portion has an annular recess. An annular elastic member is disposed in the annular recess in such a manner that when the brake is in the released state, the annular elastic member partially projects from the annular recess and is in contact with the other end face. A slide-distance adjustment bolt has a thread-free shank between an enlarged head at one end and a screw thread at the other end. The shank has a length greater than the thickness of the adjustment plate. The slide-distance adjustment bolt extends through an opening in the adjustment plate and is threaded on the end face of the boss. The brake plate is slidable on the rotating shaft in opposite directions by a biasing force of the brake spring and an elastic recovery force of the elastic member acting in opposite directions. A distance within which the brake plate is slidably movable is determined by the difference between the length of the thread-free shank of the slide-distance adjustment bolt and the thickness of the adjustment plate. A gap provided between the armature and the lining when the brake is in the released state is smaller than a gap provided between the field and the armature when the brake is in the engaged state.

With this construction, when the brake is in the engaged state, the electromagnetic coil is not excited and, hence, the field is not magnetized. The armature is urged against the lining of the brake by the force of the brake spring. The brake plate is displaced away from the field by a distance (slide distance) equal to the difference between the length of the cylindrical shank of the slide-distance adjustment bolt and the thickness of the adjustment plate. The field and the armature is spaced by a first gap.

When the electromagnetic coil is excited to release the brake, the field is magnetized whereupon the armature is attracted onto the field against the force of the brake spring. In this instance, since the annular elastic member is allowed to spring back to its original shape, the brake plate is forced by the recovery force of the elastic member to slide toward the armature by the slide distance until the armature and the lining define a second gap therebetween. The second gap is smaller than the first gap by the slide distance.

When current to the electromagnetic coil is removed, the field is demagnetized. Thus, by the force of the brake spring, the armature is urged against the lining to thereby engage the brake.

Since the striking distance (i.e., the travel distance of the armature achieved before collision with the lining) is represented by the first gap which is smaller than the second gap by the slide distance, and since the first gap is smaller than the corresponding gap of the conventional electromagnetic brake which is equal to the second gap, a striking noise which is generated when the armature strikes on the lining is reduced correspondingly. Such noise reduction effect can be achieved without increasing working accuracies of the parts of the brake.

Additionally, the annular elastic member provided behind the lining as viewed from the armature can absorb an impact force applied from the armature to the lining.

The difference between the length of the thread-free shank of the slide-distance adjustment bolt and the thickness of the adjustment plate can be varied to adjustably change the gap between the armature and the lining. With this adjustment, it is possible to accommodate a change in the first gap which may occur due to abrasive wear of the lining.

In one preferred form of the present invention, there is provided a spring-actuated electromagnetic brake including a stationary field having an electromagnetic coil embedded therein for magnetizing the field. A brake plate is mounted on a rotating shaft such that the brake plate can rotate in unison with the rotating shaft and is slidably movable in the axial direction of the rotating shaft. The brake plate has a lining on one surface thereof and a boss having an end face directed away from the lining. An armature is disposed between the field and the lining of the brake plate and movable only in the axial direction of the rotating shaft. A brake spring urges the armature into pressure contact with the lining of the brake plate to normally hold the brake in the engaged state. The armature is attracted onto the field against the force of the brake spring when the field is magnetized by the electromagnetic coil to release the brake. An adjustment plate is attached to the rotating shaft for regulating sliding movement of the brake plate in the axial direction of the rotating shaft. The adjustment plate has an end face engageable with the end face of the boss to limit sliding movement of the brake plate in a direction away from the field when the brake is engaged by the force of the brake sprig. An elastic member acts between the end face of the boss and the end face of the adjustment plate and elastically urges the brake plate to slide on the rotating shaft in a direction toward the field. A slide-distance adjustment bolt is threaded to the end face of the boss through the adjustment plate. The bolt has an enlarged head engageable with an opposite end face of the adjustment plate to limit sliding movement of the brake plate in the direction toward the field. The head is normally spaced from the opposite end face of the adjustment plate such that a first gap provided between the armature and the lining when the brake is in the released state is smaller than a second gap provided between the field and the armature when the brake is in the engaged state.

Preferably, one of the end face of the boss and the end face of the adjustment plate has an annular recess formed concentrically with the rotating shaft, and the elastic member is an annular elastic member received in the annular recess in such a manner that when the brake is in the released state, the annular elastic member partially projects from the annular recess and is in contact with the other end face.

It is preferable that the spacing between the head of the slide-distance adjustment bolt and the opposite end face of the adjustment plate can be adjusted by turning the slide-distance adjustment bolt in a desired direction to vary the first gap provided between the armature and the lining of the brake plate.

The slide-distance adjustment bolt preferably has a screw thread at an end opposite to the enlarged head, and a thread-free cylindrical shank between the head and the screw thread. The cylindrical shank has a length larger than the thickness of the adjustment plate, and the spacing between the head of the slide-distance adjustment bolt and the opposite end face of the adjustment plate is determined by the difference between the length of the cylindrical shank and the thickness of the adjustment plate.

The above and other objects, features and advantages of the present invention will become apparent to those versed in the art upon making reference to the following detailed description and the accompanying sheets of drawings in which a certain preferred embodiment incorporating the principle of the present invention is shown by way of illustrative example.

DETAILED DESCRIPTION OF THE PREFERRED EMBODIMENT

A preferred structural embodiment of the present invention will be described in greater detail with reference to the accompanying drawings wherein like parts are designated by the same reference characters throughout the several views.

Figure 1:
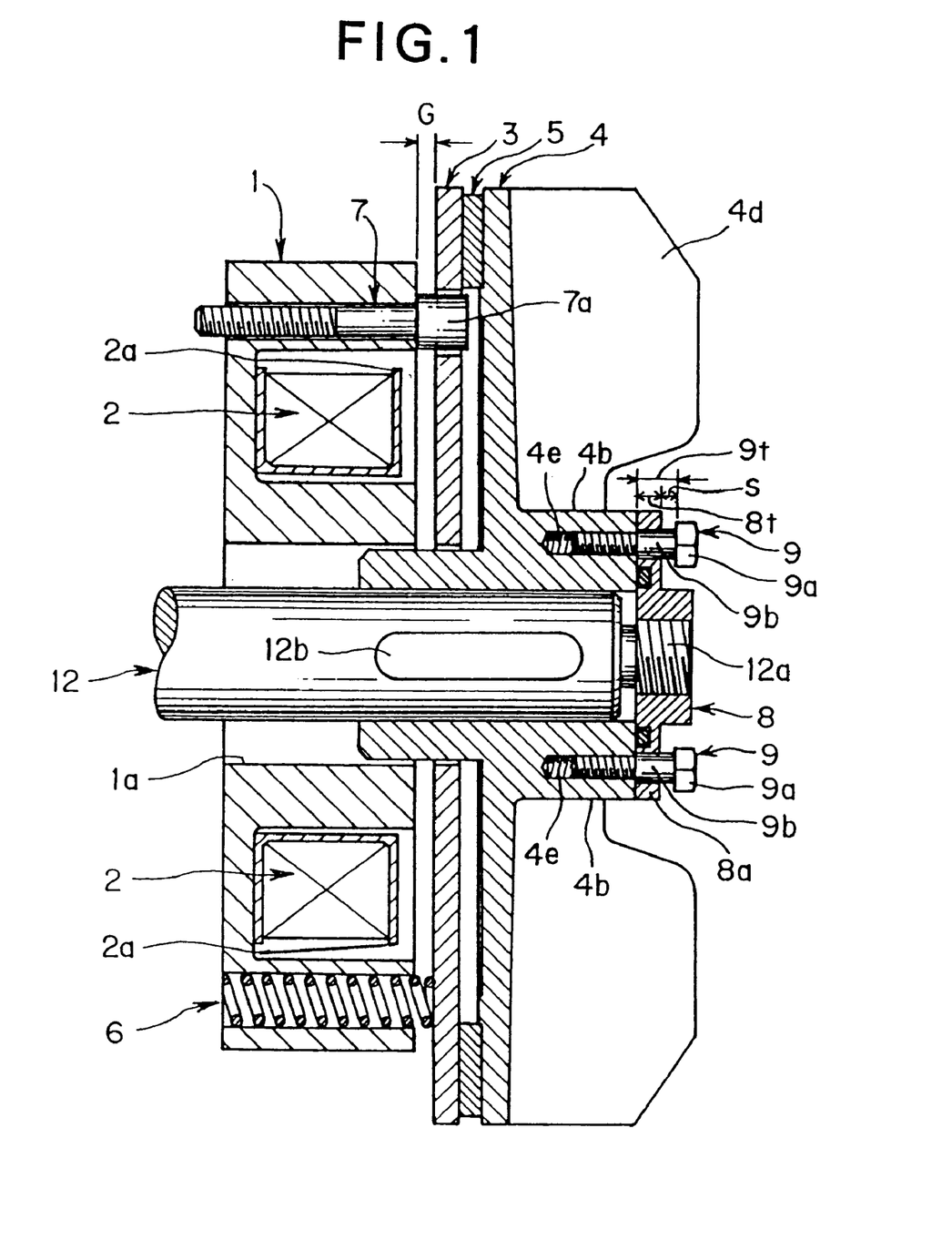
FIG. 1 is a cross-sectional view showing the general construction of a spring-actuated electromagnetic brake having a noise suppressing device according to an embodiment of the present invention.
Figure 2:
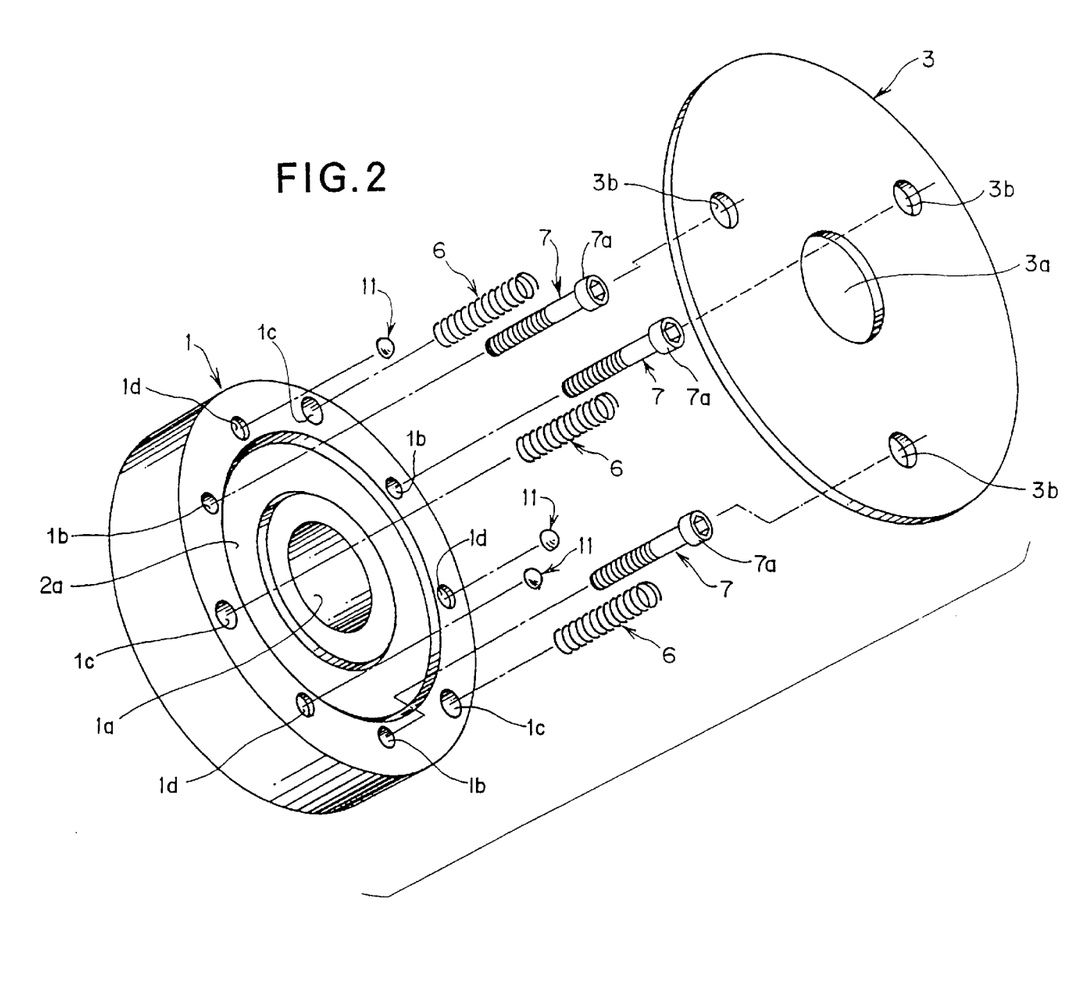
FIG. 2 is an exploded perspective view of a part of the electromagnetic brake including a field, an armature and related parts thereof.

As shown in FIGS. 1 and 2, a spring-actuated electromagnetic brake having a noise suppressing device according to one embodiment of the present invention includes a field 1 formed from a magnetic material and having an electromagnetic coil 2 (FIG. 1) embedded in the field 1 via an insulating member 2a. The field 1 has three bolt-insertion holes 1b (FIG. 2) formed therein at equal angular intervals about a central axis of the field 1. The field 1 is attached, for example, to the rear end of a frame of a motor (neither shown) by three attaching bolts 7 extending through the bolt-insertion holes 1b. The field 1 further has three spring retaining holes 1c (FIG. 2) formed therein at equal angular intervals about the central axis of the field 1. Each of the spring retaining holes 1c receives therein one brake spring 6. One end of the brake spring 6 abuts on the rear end of the non-illustrated motor frame.

The electromagnetic brake 1 also includes an armature 3 disposed in confronting relation to the insulating member 2a of the electromagnetic coil 2. One end face of the armature 3 is in contact with the opposite end of the brake spring 6 so that by the force of the brake spring 6 the armature 3 is urged in a direction toward a brake plate 4 (FIG. 1) described later. The armature 3 is formed from a magnetic material and takes the form of a circular disc having a predetermined thickness. The circular disc-like armature 3 has a central hole 3a (FIG. 2) and three guide holes 3b (FIG. 2) arranged at equal angular intervals about the center of the central hole 3a. The guide holes 3b are aligned with the bolt-insertion holes 1b of the field 1 and loosely fitted around respective heads 7a of the attaching bolts 7. Thus the armature 3 is movable in the axial direction thereof.

As shown in FIG. 2, the field 1 further has three circular recesses 1d formed in an end face thereof which faces the armature 3. The circular recesses 1d are spaced at equal angular intervals about the axis of the field 1. The circular recesses 1d, the bolt-insertion holes 1b and the spring retaining holes 1c are all arranged on the same circle. Three hemispherical elastic members 11 made, for example, of rubber are each disposed in one of the circular recesses 1d. More specifically, the hemispherical elastic members 11 are designed such that when the brake is in the actuated or engaged state shown in FIG. 4A, part of a hemispherical surface of each hemispherical elastic member 11 projects outward from the circular recess 1d and is in contact with an opposite end face of the armature 3, as better shown in FIG. 4B.

As an alternative, (not shown) the circular recesses 1d may be formed in the end face of the armature 3 for receiving therein the hemispherical elastic members 11. Also in this case, the hemispherical elastic members 11 are so designed as to have a spherical surface portion which projects from the associated circular recess 1d and is in contact with an end face of the field 1 when the brake is in the engaged state.

As shown in FIG. 1, a rotating shaft, such as a motor shaft rotatably supported by bearings (not shown), extends through the central hole 1a (FIG. 2) of the field 1. The rotating shaft 12 has an externally threaded end portion 12a of a reduced diameter. The brake plate 4 is mounted on the rotating shaft 12 such that the brake plate 4 can rotate in unison with the rotating shaft 12 and also can slide in the axial direction of the rotating shaft 12. The brake plate 4 has a lining 5 attached to one end face thereof and a plurality of fins 4d formed integrally on the other end face thereof.

Figure 3:
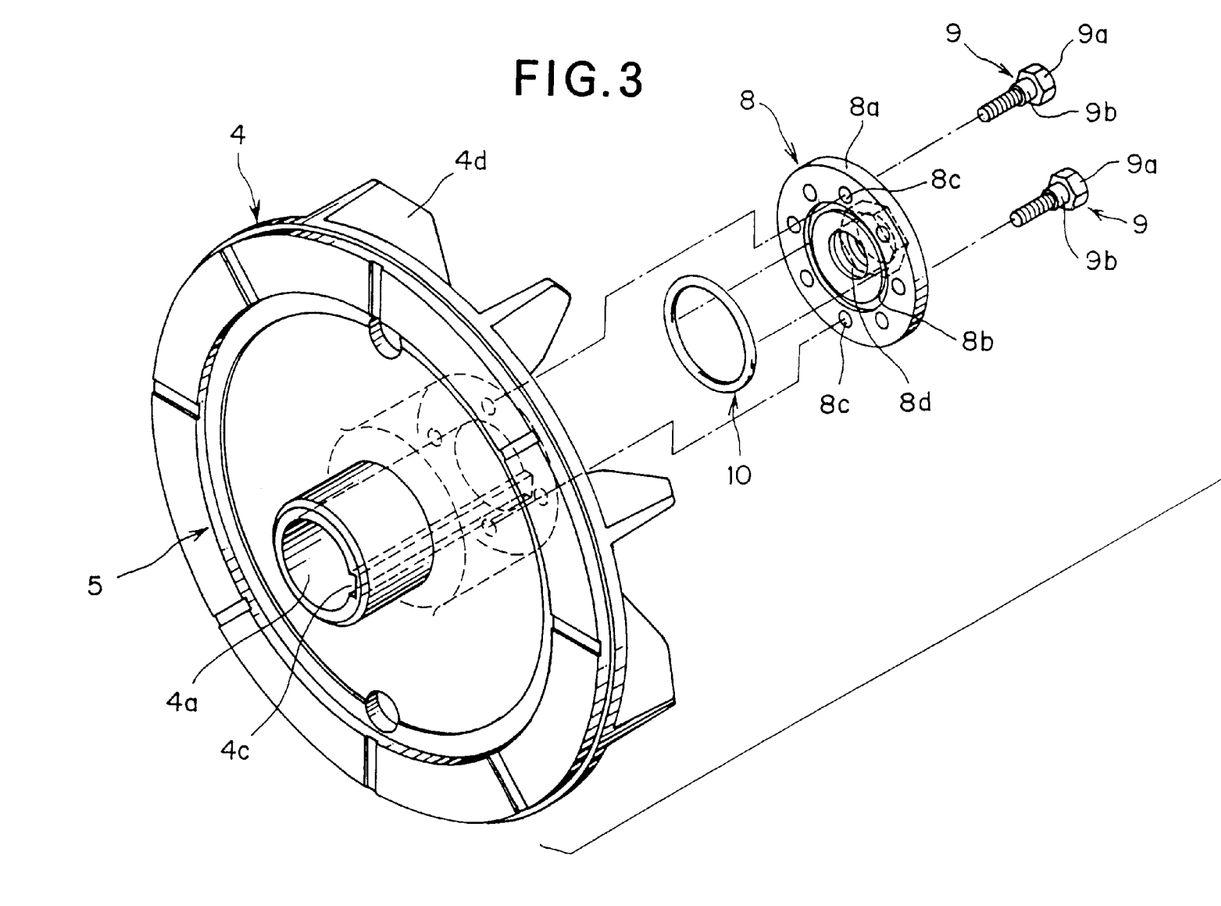
FIG. 3 is an exploded perspective view of a part of the electromagnetic brake including a brake plate, an adjustment plate and related parts thereof.

The brake plate 4 is attached to the rotating shaft 12 via an adjustment plate 8, slide-distance adjustment bolts 9 and an annular elastic member 10 (FIG. 3) such as an O-ring. As shown in FIG. 3, the adjustment plate 8 is comprised of a circular disc-like plate and has an internally threaded central hole 8d, an annular flange portion 8a, an annular groove or recess 8b formed in an inner end face of the flange portion 8a in concentric relation to the central hole 8d, and a plurality of through-holes or openings 8c extending across the thickness of the flange portion 8a. The annular elastic member (O-ring) 10 has a greater volume than the annular recess 8b and, in its free state, the annular elastic member 10 partially projects outward from the recess 8b. The slide-distance adjustment bolts 9 (two being shown) each have an enlarged head 9a at one end, a screw thread (not designated) at the other end, and a thread-free cylindrical shank 9b between the head 9a and the screw thread. The thread-free cylindrical shank 9b is larger in outside diameter than the screw thread and has a length 9t greater than the thickness 8t of the flange portion 8a by a distance s (FIGS. 1 and 4A) for a purpose described later.

When the brake plate 4 is to be mounted on the rotating shaft 12, the brake plate 4 is fitted over the rotating shaft 12 from the externally threaded end portion 12a thereof while a key seat 4c (FIG. 3) formed in the brake plate 4 is kept in alignment with a key attached to the rotating shaft 12. Then the internally threaded central hole 8d of the adjustment plate 8 is threadedly fitted over the externally threaded end portion 12a of the rotating shaft 12 until the spacing between the field 1 and the armature 3 is reduced to a predetermined gap G against the biasing force of the brake spring 6 while the inner end face of the flange portion 8a is held in abutment with end face of a boss 4b of the brake plate 4. Thereafter, the slide-distance adjustment bolts 9 are inserted into the openings 8c of the adjustment plate 8, then threaded into internally threaded holes 4e in the boss 4b of the brake plate 4 until the respective thread-free cylindrical shanks 9b abut against the end face of the boss 4b at an end adjacent to the respective screw threads of the slide-distance adjustment bolts 9. When such abutment takes place, the heads 9a of the slide-distance adjustment bolts 9 are spaced from the outer end face of the flange portion 8a of the adjustment plate 8 by a distance s. This distance s defines a maximum range of axial sliding movement of the brake plate 4 relative to the adjustment plate 8 and hence is referred to as "slide distance". In this instance, the annular elastic member (O-ring) 10 fitted in the annular recess 8b is compressed, as shown in FIG. 4.

Though not shown, the annular recess 8b formed in the adjustment plate 8 may be replaced by an annular recess formed in the end face of the boss 4b of the brake plate 4. In this case, the annular elastic member (O-ring) 10 is fitted in the non-illustrated annular recess in the boss 4b.

The slide distance s is determined by the difference between the length 9t of the cylindrical shanks 9b of the slide-distance adjustment bolts 9 and the thickness 8t of the flange portion 8a of the adjustment plate 8. This means that the slide distance s of the brake plate 4 can be adjusted by changing the difference between the length 9t of the cylindrical shanks 9b of the slide-distance adjustment bolts 9 and the thickness 8t of the flange portion 8a of the adjustment plate 8.

The spring-actuated electromagnetic brake of the foregoing construction operates as follows.

Figures 4A, 4B:
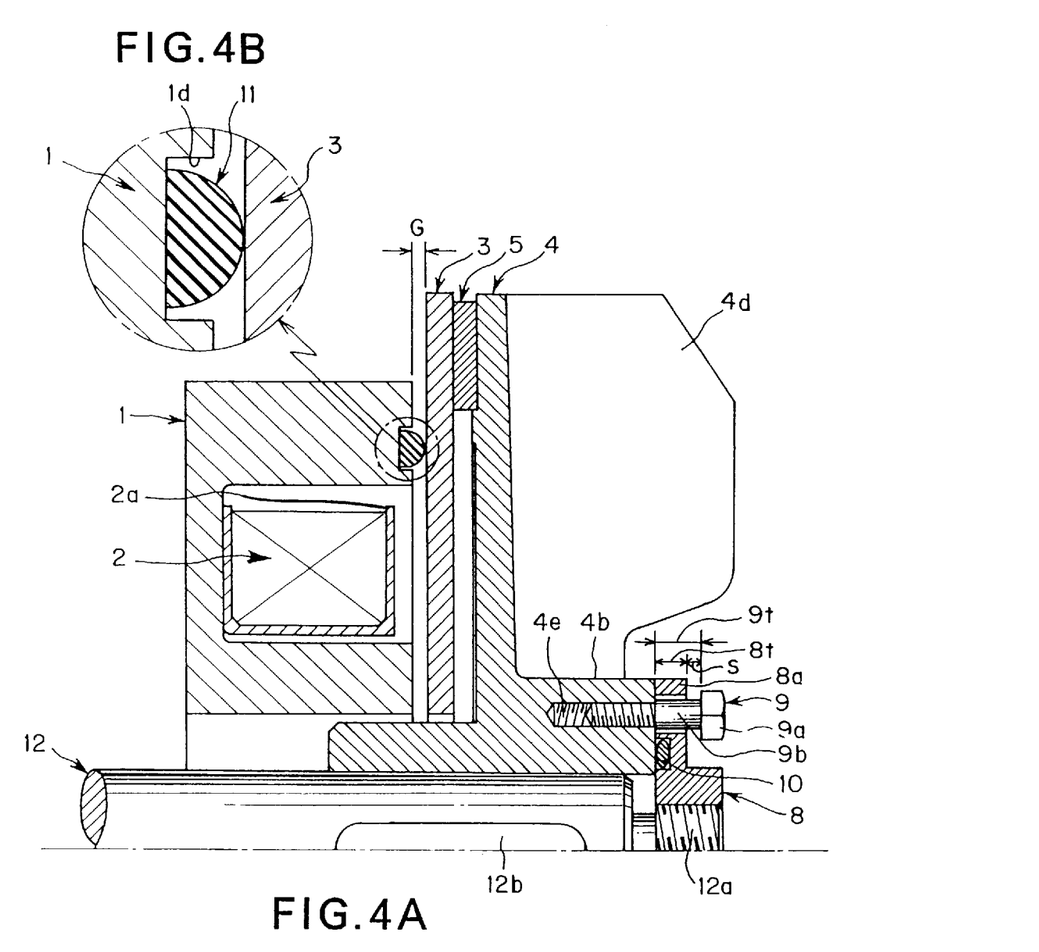
FIG. 4A is a fragmentary cross-sectional view of the electromagnetic brake as it is in the actuated or engaged state.
FIG. 4B is an enlarged view of a portion of FIG. 4A.

In the normal condition, the brake is actuated by the force of the brake springs 6, as shown in FIG. 4A. In other words, the electromagnetic coil 2 is not excited and, hence, the field 1 is not magnetized. Accordingly, by the biasing force of the brake springs 6 (FIG. 1) the armature 3 is urged against the lining 5 of the brake plate 4 and the brake plate 4 is urged rightward until the boss 4b abuts on the flange portion 8a of the adjustment plate 8. Thus, the rotating shaft 12 is brought to a full stop. The field 1 and the armature 3 are spaced from each other with the gap G defined therebetween. The hemispherical elastic members 11 disposed in the circular recesses 1d in the field 1 are in the free state in which, as shown in FIG. 4B, the elastic members 11 partially project from the recesses 1d and are in contact with the end face of the armature 3.

Figures 5A, 5B:
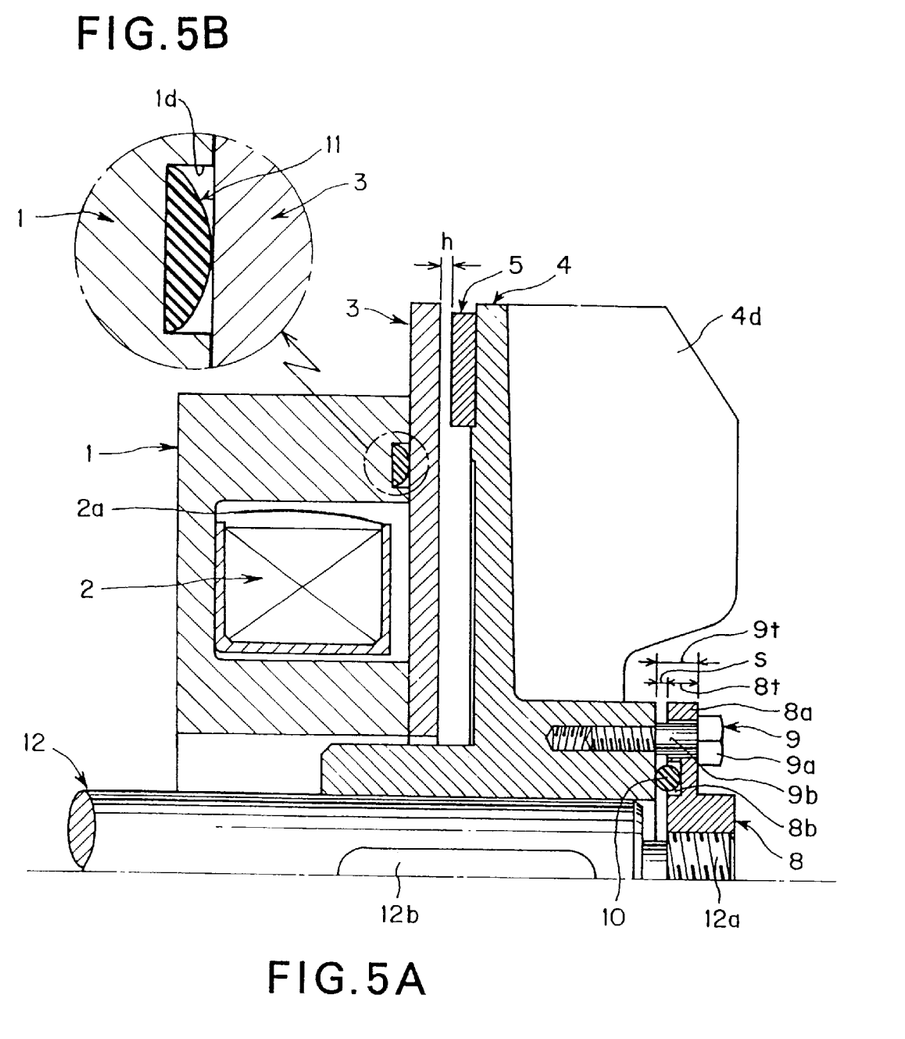
FIG. 5A is a view similar to FIG. 4A, but showing the electromagnetic brake in the released state.
FIG. 5B is an enlarged view of a portion of FIG. 5A.

When the electromagnetic coil 2 is excited in order to release the brake, the field 1 is magnetized. Thus the armature 3 is attracted toward the field 1, as shown in FIG. 5A. The armature 3 is disengaged from the lining 5 of the brake plate 4, so that the braking force on the shaft 12 is released. In this instance, the hemispherical elastic members 11 are elastically deformed by the armature 3, as shown in FIG. 5B. With this elastic deformation of the hemispherical elastic members 11, a striking noise generated when the armature 13 strikes against the field 1 can be greatly suppressed. Additionally, due to its hemispherical configuration, each of the elastic members 11 can deform as a whole to become a flattened shape and does not form a local deformation. Thus, the durability of the hemispherical elastic members 11 is very high.

When the brake is released as previously described, the annular elastic member 10, due to its elasticity, is allowed to go back to its original shape 10 after being compressed within in the recess 8b of the adjustment plate 8. By an elastic recovery force produced during recovery of the original shape of the annular elastic member 10, the brake plate 4 is forced to slide toward the armature 3 until the heads 9a of the slide-distance adjustment bolts 9 abut on the outer end face of the flange portion 8a of the adjustment plate 8, as shown in FIG. 5A. Thus, the brake plate 4 is displaced toward the armature 3 by the slide distance s. Accordingly, the lining 5 approaches the armature 3 until a clearance or gap h is defined between the armature 3 and the lining 5. The gap h thus defined is smaller by slide distance s than the gap G which is provided between the field 1 and the armature 3 when the brake is in the engaged state.

From this condition, current to the electromagnetic coil 2 is removed whereupon the field 1 is demagnetized. Thus, by the biasing force of the braking springs 6 (FIG. 1), the armature 3 is urged against the lining 5 of the brake plate 4 to thereby engage the brake again, as shown in FIG. 4A. In this instance, the hemispherical elastic members 11 are allowed to go back to their original shape after being compressed in the recesses 1d. The armature 3 is, therefore, subjected to an elastic recovery force of the hemispherical elastic members 11 which acts in the same direction as the biasing force of the brake springs 6. This may add to reduction of the braking time.

Additionally, the striking distance which is represented by the travel distance achieved by the armature 3 before collision with the lining 5 is set to be equal to the gap h (FIG. 4A). Since the striking distance h is smaller than the conventional striking distance G (shown in FIG. 7A) by the slide distance s, striking noise generated when the armature 3 strikes on the lining 5 is lowered, correspondingly.

By virtue of the annular elastic member (O-ring) 10 provided behind the lining 5 as viewed from the armature 3, an impact force applied from the armature 3 onto the lining 5 is absorbed by the annular elastic member 10 as the elastic member 10 is elastically deforms gradually with movement of the brake plate 4 in a direction away from the field 1.

Obviously, various minor changes and modifications of the present invention are possible in the light of the above teaching. It is therefore to be understood that within the scope of the appended claims the present invention may be practiced otherwise than as specifically described.

What is claimed is:

1. A spring-actuated electromagnetic brake comprising:

a field having an electromagnetic coil embedded therein;

a brake plate rotating in unison with a rotating shaft and having a lining provided on one surface of said brake plate, said brake plate including a boss having an end face facing in a direction away from said lining;

an armature disposed between said field and said lining of said brake plate and movable only in the axial direction of said rotating shaft;

a brake spring urging said armature into pressure contact with said lining of said brake plate;

said brake plate being mounted on said rotating shaft and slidably movable in the axial direction of said rotating shaft;

an adjustment plate for regulating axial sliding movement of said brake plate, said adjustment plate being attached to said rotating shaft and having an end face opposite said end face of said boss of said brake plate;

one of said end face of said adjustment plate and said end face of said boss portion having an annular recess;

an annular elastic member disposed in said annular recess in such a manner that when said brake is in the released state, said annular elastic member partially projects from said annular recess and is in contact with the other end face; and a slide-distance adjustment bolt having an enlarged head at one end, a screw thread at the other end, and a thread-free shank between said head and said screw thread, said shank having a length greater than the thickness of said adjustment plate, said slide-distance adjustment bolt extending through an opening of said adjustment plate and threaded on said end face of said boss, wherein said brake plate is slidable on said rotating shaft in opposite directions by a biasing force of said brake spring and an elastic recovery force of said elastic member acting in opposite directions, a distance within which said brake plate is slidably movable is determined by the difference between said length of said thread-free shank of said slide-distance adjustment bolt and said thickness of said adjustment plate, and a gap provided between said armature and said lining when said brake is in the released state is smaller than a gap provided between said field and said armature when said brake is in the engaged state.

2. A spring-actuated electromagnetic brake according to claim 1, wherein said difference between said length of said thread-free shank of said slide-distance adjustment bolt and said thickness of said adjustment plate can be varied to adjustably change said gap between said armature and said lining.

3. A spring-actuated electromagnetic brake comprising:

a stationary field having an electromagnetic coil embedded therein for magnetizing said field;

a brake plate mounted on a rotating shaft such that the brake plate can rotate in unison with the rotating shaft and is slidably movable in the axial direction of the rotating shaft, said brake plate having a lining on one surface thereof and a boss having an end face directed away from said lining;

an armature disposed between said field and said lining of said brake plate and movable only in the axial direction of the rotating shaft;

a brake spring urging said armature into pressure contact with said lining of said brake plate to normally hold said brake in the engaged state, said armature being attracted onto said field against the force of said brake spring when said field is magnetized by said electromagnetic coil to release said brake;

an adjustment plate attached to said rotating shaft for regulating sliding movement of said brake plate in the axial direction of the rotating shaft, said adjustment plate having an end face engageable with said end face of said boss to limit sliding movement of said brake plate in a direction away from said field when the brake is engaged by the force of said brake spring;

an elastic member acting between said end face of said boss and said end face of said adjustment plate and elastically urging said brake plate to slide on the rotating shaft in a direction toward said field; and a slide-distance adjustment bolt threaded to said end face of said boss through said adjustment plate, said bolt having an enlarged head engageable with an opposite end face of said adjustment plate to limit sliding movement of said brake plate in the direction toward said field, said head being normally spaced from said opposite end face of said adjustment plate such that a first gap provided between said armature and said lining when said brake is in the released state is smaller than a second gap provided between said field and said armature when said brake is in the engaged state.

4. A spring-actuated electromagnetic brake according to claim 3, wherein one of said end face of said boss and said end face of said adjustment plate has an annular recess formed concentrically with said rotating shaft, and said elastic member is an annular elastic member received in said annular recess in such a manner that when said brake is in the released state, said annular elastic member partially projects from said annular recess and is in contact with the other end face.

5. A spring-actuated electromagnetic brake according to claim 3, wherein the spacing between said head of said slide-distance adjustment bolt and said opposite end face of said adjustment plate can be adjusted by turning said slide-distance adjustment bolt in a desired direction to vary said first gap provided between said armature and said lining of said brake plate.

6. A spring-actuated electromagnetic brake according to claim 5, wherein said slide-distance adjustment bolt has a screw thread at an end opposite to said enlarged head, and a thread-free cylindrical shank between said head and said screw thread, said cylindrical shank having a length larger than the thickness of said adjustment plate, and said spacing between said head of said slide-distance adjustment bolt and said opposite end face of said adjustment plate being determined by the difference between the length of said cylindrical shank and the thickness of said adjustment plate.

* * * * *